United States Patent
Rouse

(10) Patent No.: US 8,414,792 B2
(45) Date of Patent: Apr. 9, 2013

(54) CARBON NANOTUBE DISPERSIONS

(75) Inventor: Jason H. Rouse, Martinsville, NJ (US)

(73) Assignee: Sun Chemical Corporation, Parsippany, NJ (US)

(*) Notice: Subject to any disclaimer, the term of this patent is extended or adjusted under 35 U.S.C. 154(b) by 0 days.

(21) Appl. No.: 13/062,830

(22) PCT Filed: Sep. 9, 2009

(86) PCT No.: PCT/US2009/056293
§ 371 (c)(1),
(2), (4) Date: May 6, 2011

(87) PCT Pub. No.: WO2010/051102
PCT Pub. Date: May 6, 2010

(65) Prior Publication Data
US 2011/0204281 A1 Aug. 25, 2011

Related U.S. Application Data

(60) Provisional application No. 61/095,352, filed on Sep. 9, 2008.

(51) Int. Cl.
C09K 5/00 (2006.01)
(52) U.S. Cl. ........ 252/75; 423/447.2; 977/742; 524/612
(58) Field of Classification Search ............... 252/75, 252/506; 423/447.2; 524/612, 576, 274; 977/742
See application file for complete search history.

(56) References Cited

U.S. PATENT DOCUMENTS

| | | | |
|---|---|---|---|
| 4,946,508 A | 8/1990 | Schwartz et al. | |
| 4,946,509 A | 8/1990 | Schwartz et al. | |
| 5,024,698 A | 6/1991 | Schwartz et al. | |
| 5,062,894 A | 11/1991 | Schwartz et al. | |
| 7,060,241 B2 | 6/2006 | Glatkowski | |
| 7,244,407 B2 | 7/2007 | Chen et al. | |
| 7,265,174 B2 | 9/2007 | Carroll et al. | |
| 2007/0116627 A1 | 5/2007 | Collier et al. | |
| 2007/0137701 A1 | 6/2007 | Sainte Catherine et al. | |

OTHER PUBLICATIONS

Y. Wang, et al. "Fabrication of carbon nanotubes/copper phthalocyanine composites with improved compatability". Materials Sciecne and Engineering B 117 (2005) 296-301.*
Ma, A.; Lu, J.; et al. "Quantitative Non-Covalent Functionalization of Carbon Nanotubes". J. Cluster Science, 17 (4) Dec. 2006.*
Nkoski, D.,; Ozoemena, K.; "Self-assembled nano-arrays of single-walled carbon nanotube-octa(hydroxyethylthio)phthalocyaninatoiron(II) on gold surfaces: Impacts of SWCNT and solution pH on electron transfer kinetics". Electrochimica Acta 53 (2008_5782-2973 (Online Nov. 7, 2007).*
"Immobilization of tetra-tert-butylphthalocynanines on carbon nanotubes: a first step towards the development of new nanomaterials"; X. Wang, Y. Liu, W. Qiu, and D. Zhu; J. Mater. Chem, 2002, 12, pgs. 1636-1639.
"Fabrication of carbon nanotubes/copper phthalocyanine composites with improved compatibility"; Y. Wang, H-Z. Chen, H-Y Li, and M. Wang; Materials Science and Engineering, B. 117, 2005, pgs. 296-301.
"Quantitative Non-Covalent Functionalization of Carbon Nanotubes"; A. Ma, J. Lu, S. Yang, and Km Ng; J. of Cluster Science; vol. 17, No. 4, Dec. 2006; pp. 599-608.
"Nanostructured Copper Phthalocyanine-Sensitized Multiwall Carbon Nanotube Films"; R. Hatton, N. Blanchard, V. Stolojan, A. Miller, and S. Silva; Langmuir, 2007, 23, pp. 6424-6430.
"Polymer/Single-Walled Carbon Nanotube Films Assembled via Donor-Acceptor Interactions and Their Use as Scaffolds for Silica Deposition"; J. Rouse, P. Lillehei, J. Sanderson, and E. Siochi; Chem. Mater., 2004, 16, pp. 3904-3910.
"Photoinitiators for Free-Radical-Initiated PhotoImaging Systems"; B. Monroe and G. Weed; Chem. Rev.; 1993, 93, pp. 435-448.
Wang et al. "Immobilization of tetra-*tert*-butylphthalocynanines on carbon nanotubes: a first step towards the development of new nano materials", J. Mater. Chem, 2002, vol. 12, pp. 1636-1639.
Wang et al. "Fabrication of carbon nanotubes/copper phthalocyanine composites with improved compatibility", Materials Science and Engineering B, vol. 117, 2005, pp. 296-301.
Ma et al. "Quantitative non-covalent functionalization of carbon nanotubes", Journal of cluster Science, vol. 17, No. 4, Dec. 2006, pp. 599-608.
Hatton et al. "Nanostructured copper phthalocyanine-sensitized multiwall carbon nanotube films", Langmuir, vol. 23, Mar. 2007, pp. 6424-6430.
Rouse et al. "Polymer/single-walled carbon nanotube films assembled via donor-acceptor interactions and their use as scaffolds for silica deposition", Chem. Mater. vol. 16, 2004, pp. 435-448.
Monroe et al. "Photoinitiators for free-radical-initiated photoimaging systems", Chem. Rev. vol. 93, 1993, pp. 435-448.

* cited by examiner

Primary Examiner — Stanley Silverman
Assistant Examiner — Richard M Rump
(74) Attorney, Agent, or Firm — McKenna Long & Aldridge LLP; Matthew Bailey

(57) ABSTRACT

The efficient dispersion of carbon nanotubes in various media and methods of using the same in such applications as inks, coatings, and composites and in various electrical and electronic articles are disclosed. A dispersant is used which has the formula P-(U-Y)s where P is a metal or metal-free phthalocyanine, Y is a compatibilizing moiety with a molecular weight between 500 and 5000 g/mol, U is a linking moiety covalently bonding Y to P, and s is an integer between 1 and 4.

24 Claims, No Drawings

CARBON NANOTUBE DISPERSIONS

This disclosure claims the priority of U.S. application No. 61/095,352, filed Sep. 9, 2008, the entire contents of which is incorporated herein by reference.

BACKGROUND OF THE INVENTION

Carbon nanotubes are, in general, elongated tubular bodies which are typically only a few atoms in circumference. They are hollow and have a linear fullerene structure. The length of the carbon nanotubes potentially may be millions of times greater than their molecular-sized diameter.

Carbon nanotubes are thus sheet(s) rolled to form a long tubular fibers of nanodimensions. Depending upon the number of sheets contained within the tube, the carbon nanotube can be described as single walled (SWCNT) (one sheet) or double walled (DWCNT) (two sheets) or multiwall (MWCNT) (3 sheets or more). The average diameter of SWCNTs range from 0.5 nm to up to 5 nm, with the majority being in the 0.5 to 2.0 nm range. The SWCNT may have metallic or semiconducting electrical properties depending upon the registration at the seam where the 2 sides of the sheet meets to form the tube. With DWCNTs having a tube within a tube construction, the diameter is primarily in the 1.5 to 5 nm range. MWCNTs have been further segmented into few walled varieties (3 to less than about 10 sheets) with diameters primarily in the 5 to 20 nm range, and true multiwall consisting of 10 to <30 sheets and with diameters greater than 100 nm possible. Depending upon the technique used to manufacturer the particular CNT, the lengths can range from less than 1 micron to 10 tens of microns and possibly even millimeters.

Since the first report of carbon nanotubes by Iijima in 1991 (Nature 354 (1991) 56-58), CNTs have been one of the most researched materials due to their unique properties. The rolled sheet provides them with high elasticity and tensile strength, good electrical and thermal conductivities, good thermal stability and chemical resistance. For example, it has been estimated that SWCNTs conduct heat and electricity better than copper or gold, and have 100 times the tensile strength of steel but at only a sixth of the weight. Extraordinarily small sizes can be made. For example, carbon nanotubes are being produced that are approximately 1/50,000th the width of a human hair.

As a result of these properties, CNTs are well suited for a variety of applications utilizing their electrical properties or mechanical properties or even their ultra small tubular structure either individually or in combination. For example, researchers have demonstrated that CNTs can provide the same level of conductivity to insulating plastics as afforded by electroconductive carbon black but at much lower loadings and in many cases, with the added benefit of improved mechanical properties. The electrical conductivity, in particular of SWCNTs, is such that their potential usage within transparent conductive electrodes has been of particular interest. Therefore, applications ranging from electromagnetic shielding to radar absorption to electrically conducting plastics and coatings are possible. The thermal conductivity properties of CNTs coupled with their nano-size has made them interesting candidates for thermal management in next generation microelectronic devices. In the area of mechanical reinforcement, many researchers have demonstrated matrix improvements upon the addition of CNTs to form ultra-strong and light weight composites. The high surface area and charge carrying ability of CNTs also makes them ideal candidates for energy storage devices such as batteries and capacitors. CNTs have even been used to help probe other nanomaterials by using them as ultrafine tips in atomic force microscopy (AFM).

There are four common methods for producing carbon nanotubes, namely: 1) laser vaporization techniques; 2) electric arc techniques; 3) gas phase techniques; and 4) chemical vapor deposition. In laser vaporization and electric arc techniques, the CNTs are produced by vaporizing graphite, with or without metal catalyst present, using either a laser beam or an electric arc, respectively. The development of catalyst systems to allow the controlled growth of CNT type is an area of continued focus. In gas phase techniques, a carbon source is run across a bead of catalyst particles under pressure and heat to produce normally a continuous stream of CNTs. A well known gas phase Process is the HiPco process developed by Richard Smalley which utilizes carbon monoxide as the carbon source and has been shown to be adept at producing large quantities of SWCNTs.

A central difficulty in working with and incorporating CNTs into materials and devices is that the tubular sheet responsible for their remarkable properties also renders them nearly insoluble in solvents. Therefore, substantial research effort has been expended towards the efficient dispersion of CNTs. Methods of rendering nanotubes soluble can be grouped into two broad categories: (1) covalent modification of the nanotube cylinder with groups that improve the interaction with the solvent and (2) treatment of the nanotube with a non-covalently bonded dispersion agent. Perhaps the simplest, though versatile, covalent modification strategies are the oxidation and fluorination of nanotubes. Subsequent reaction of the oxidized or fluoro groups has allowed the nanotubes to be further derivatized using a variety of agents. In addition, standard small molecule reactions such as diazonium, cycloaddition, carbene, radical, and carbanion chemistries have proven applicable towards nanotube modification. While covalent modification results in nanotubes that are soluble in solvents not compatible with pristine nanotubes and a reduction in their aggregation behavior, chemical functionalization unfortunately results in the incorporation of defects into the aromatic system responsible for their unique properties. To circumvent the necessity of chemically modifying the nanotube to affect solubility, compounds such as surfactants, polyaromatics, biopolymers, synthetic polymers, and encapsulation agents have been explored to disperse CNTs. For instance, carbon nanotubes have been solubilized in organic solvents and water by polymer wrapping, but a disadvantage of this approach is that the polymer is very inefficient in wrapping the small-diameter single-walled carbon nanotubes produced by the HiPco process (the only high purity material currently produced on a large scale) because of high strain conformation required for the polymer.

The dispersing agent approach does not have the same net loss of some of the CNTs unique properties. A vast number of the dispersants which have been proposed are mere encapsulates/wetting agents and therefore do not provide for the interfacial adhesion needed in mechanical applications. Some of the most effective dispersant systems are those that incorporate $\pi$-$\pi$ interactions, such as conducting polymers, highly aromatic polymers, and polyaromatic groups. In the case of the conjugated/aromatic polymers, a difficulty is that the chemistry used to make such systems involves multi-step synthesis including metal coupling steps, and therefore the dispersants are expensive. Also, the dispersant is useful with only one type of CNT or the dispersant is only effective in one or a few solvent systems, and therefore lacks general applicability in most cases. For example, while sodium dodecylsulfate has been widely used to disperse SWCNTs in aqueous solution, the ionic nature of sodium dodecylsulfate requires a limited pH range for effectiveness and the dispersant is limited to aqueous environments. Polymeric dispersants also have solvent limitations such as with poly(4-vinylpyridine) which can disperse CNTs in alcohols but not water (Chemistry of Materials 2004, 16, 3940-3910). Therefore, the development of a dispersant platform technology allowing SWCNTs, DWCNTs, and MWCNTs to be effectively dispersed in a wide-range of matrices is of importance.

The carbon nanotube literature does contain a few references to phthalocyanines being tried to disperse CNTs. For example, X. Wang et al. Q. Mater. Chem., 2002, 12, pp 1636-1639) report functionalizing carbon nanotubes by non-covalent absorption of tetra-tert-butylphthalocyanine from chloroform solution, but do not address the stability of the resulting composite nor its ability to be dispersed in a solvent or other matrix.

Chemistry of Materials 2004, 16, 3940-3910 illustrates that polymeric dispersants also have solvent limitations, indicating that poly(4-vinylpyridine) can disperse CNTs in alcohols but not in water.

Y. Wang et al. (Materials Science and Engineering B 117, 2005, 296-301) formed "composites" of multiwall carbon nanotubes and copper phthalocyanine following covalent attachment to both of a long allyl chain. The authors report "enhanced solubility" of the composite in organic solvents, and UV-vis spectra show strong electronic interaction between the two "composite" constituents. However, when MWCNT's and copper phthalocyanine were separately incorporated in a polymer matrix (polyvinyl butyral), UV-vis spectra showed absence of significant electronic interaction between the two, and poor dispersibility. It should also be noted that covalently attaching chemical groups to carbon nanotubes is, as earlier explained, undesirable.

Ma et al. (Journal of Cluster Science, 2006, 17, 599-608) disclose the absorption of copper and copper-free 2,9,16,23-tetra-tert-butyl-29H,31H-phthalocyanine onto single walled carbon nanotubes. While limited functionalization of the nanotubes is reported, nothing is disclosed about their dispersibility. Moreover, the three solvents utilized in the study (dimethylformamide, chloroform, and 1,2-dichlorobenzene) are all known to allow some amount of SWCNT solubility (Chem. Comm. 2001, 193-194). Thus, these experiments do not demonstrate that the phthalocyanines utilized are in fact dispersing the SWCNTs.

US Patent application 2007/0137701 (WO 2004/060988 A3) discloses the uses of a phthalocyanine pigment in the form of Solsperse RTM 5000® to disperse carbon nanotubes in xylene. However, the data presented in Table 1 of the disclosure indicates that the degree of dispersion achieved was very poor and that the dispersion was not stable (Table 1, XF001), and in fact, only occurred when a secondary synergistic polymer was added (Table 1, dispersion XF003-XF017).

Hatton et al. (Langmuir, 2007, 23, 6424-6430) studied the interaction of surface oxidized multiwall carbon nanotubes (o-MWCNTs) and tetrasulfonate copper phthalocyanine (TS-CuPc). They found that dispersions of o-MWCNTs in aqueous solutions of TS-CuPc were stable toward nanotube flocculation and exhibit spontaneous nanostructuring upon spin casting onto a uniform film. The film was composed of an o-MWCNT "scaffold" decorated with phthalocyanine molecules self assembled into extended aggregates. The ionic nature of sodium dodecylsulfate requires a limited pH range for effectiveness and the dispersant is limited to aqueous environments. There is no suggestion that the "scaffolding" has an ability to disperse in any solvent or other organic media. Furthermore as in the case of X. Wang, the nanotubes used have been chemically modified.

Thus there exists, in the literature, no systematic protocol for generating dispersants which, preferably by non-covalent interaction with carbon nanotubes, are capable of producing stable nanotube dispersions in organic or other media. Such stable dispersions would be of great utility in permitting exploitation of the unique properties of nanotube discussed earlier. Therefore, the development of a dispersant platform technology allowing SWCNTs, DWCNTs, and MWCNTs to be effectively dispersed in a wide-range of matrices is of significant technical and commercial importance.

DETAILED DESCRIPTION OF THE INVENTION

The present invention is directed to (a) a method of solubilizing carbon nanotubes, (b) compositions of matter formed using the dispersant treated carbon nanotubes, and (c) articles containing the compositions of matter formed using the dispersant treated carbon nanotubes. Various embodiments of the present invention are described in more detail below.

In one aspect, (a) this invention relates to a dispersing additive for carbon nanotubes having the structure P-(U-Y)$_s$, where P is the residue of a metal or metal-free phthalocyanine, Y is a compatibilizing moiety with a molecular weight between 500 and 5000 g/mol, U is a linking moiety covalently bonding Y to P, and s is an integer between 1 and 4. Another aspect (b) involves a composition combining the carbon nanotubes and dispersing additive. In another aspect (c), the composition is contained within a matrix. The matrix may be, but is not limited to, an organic polymer, an inorganic polymer, a metal, a ceramic, a metal oxide, a carbide, an energy curable composition, a nanocomposite, and combinations thereof. It can also be a fluid, a composite, or a masterbatch possessing electrical conductivity. A non-volatile matrix can be caused to form a solid upon application of a curing event.

Through manipulation of the functionalized metal or metal-free phthalocyanines, it becomes possible to disperse CNTs in a variety of solvents and matrixes. The interaction between the inventive dispersant and the CNT is believed to be by non-covalent bonding rather than covalent bonding. Therefore, the underlying electronic structure of the CNT and its key attributes are not affected.

According to the invention, the carbon nanotubes can be single walled carbon nanotubes (SWCNT) (one sheet) or double walled carbon nanotubes (DWCNT) (two sheets) or multiwall (MWCNT) (3 sheets or more). The MWCNTs can be further described as few walled (3-10 sheets) or the more traditional multi-walled (10 sheets or more), as defined in the literature. Additionally, the CNTs can be described as bamboo carbon nanotubes, fibrils, nanofibers, vapor grown carbon fibers (VGCF), or cylindrical carbon structures. Furthermore, the carbon nanotubes may also contain or be comprised of other elements in addition to carbon including, but not limited to, nitrogen, boron, oxygen, and sulfur and mixtures thereof. The carbon nanotubes may be described as carbon nitride nanotubes or carbon boron nitride nanotubes.

The carbon nanotubes utilized in this invention may be described as bare, pristine, unpurified, purified, or modified and may or may not have solubility in the given solvent or matrix prior to addition of the inventive dispersant. The terms "bare" and/or "pristine" and/or "unpurified" describe CNTs that have had little or no treatment since their chemical synthesis. CNTs of these types are primarily, but not limited to, materials that are available directly from the synthesis process. The term "purified" CNTs are primarily defined as CNTs that have been treated either chemically and/or thermally and/or physically to impart improved properties to the CNTs. Examples of such treatments include, but are not limited to, acid treatment to remove catalyst or amorphous carbon and thermally annealing to remove amorphous carbon and/or reduce the number of carbon defect sites. Additionally, CNTs may be media milled to break down CNT aggregates to help in CNT dispersing and processing. Various methods and approaches to purify carbon nanotubes are present in the literature and the materials prepared by any such techniques can be utilized in this invention. The term "modified" CNT encompasses broadly any type of CNT that has been treated in any manner to aid in its dispersibility or compatibility with a solvent or matrix. Such methods include, but are not limited to, functionalization of the CNT with organic groups to provide either solubilising groups and/or reactive sites for further chemistries and the treatment of the CNT with various dispersing agents (surfactant, polymer, etc.). Various methods of modifying CNTs can be found in the literature and the materials prepared by such techniques can be utilized in this invention. However, the CNT is not functionalized by a carboxydodecyl when (U-Y) is carboxydodecyl.

The carbon nanotubes (CNTs) utilized in this invention may be produced using any production method including, but not limited to, (a) laser vaporization techniques, (b) electric arc techniques, (c) gas phase techniques, and (d) chemical vapor deposition. In laser vaporization and electric arc techniques, the CNTs are produced by vaporizing graphite with or without metal catalyst present using either a laser beam or an electric arc, respectively. In gas phase techniques, a carbon source is usually run across a bead of catalyst particles under pressure and heat to produce normally a continuous stream of CNTs. Chemical vapor deposition usually evolves the use of a precursor compound that under proper conditions (heat, pressure, etc.) with or without the aid of a catalyst will decompose to form carbon nanotubes.

Dispersion of Nanotubes

The terms "dispersion" and "solubilization" are used interchangeably herein. Dispersion or solubilization when used in the context of solvent or other fluid systems is defined herein as the ability of the dispersant treated CNT to remain in solution or dispersion after centrifugation. For example, a given amount of CNT under study is added to fluids of increasing and known amounts of the inventive dispersant in a given solvent or matrix and subjected to sonication for a given period of time. After sonication, the fluids are placed in centrifugation tubes and centrifuged at the same speed and time after which the appearance of a stable dispersion is verified optically (both with the unaided eye and under optical magnification). For copper phthalocyanine based dispersants, the ability of the inventive dispersant to absorb on to the CNT surface can be confirmed by the lack of blue color (from the copper phthalocyanine dispersant) in the supernatant and the presence of black sediment below the amount of dispersant required to disperse or solubilize the carbon nanotubes.

At dispersant concentrations at and above the dispersion or solubilization level, the resulting supernatant after centrifugation is deep black in color. The amount of dispersant required to disperse the CNT is directly related to the carbon nanotubes source and type. Depending on the particular CNT, there might be some black sediment present even above the critical dispersion or solubilization level which could be from amorphous carbon contaminants or highly intertwined CNT aggregates. The amount of such residual sediment is directly related to the carbon nanotube source and type. After centrifugation, the resulting supernatant CNT dispersion is stable to further sedimentation or aggregation for at least one week and could remain stable for even months. While the CNTs can be filtered out, this separation is more a function of their large size, not their dispersion or solubility.

In the context of polymer or other non-fluid matrixes, dispersion or solubilization is defined as a homogenous distribution of the CNTs in the host matrix such that no particulates are visible with the unaided eye. Standard methods to form films or fibers of such nanocomposite are solvent casting or melt extrusion.

Dispersants for Nanotubes

The carbon nanotube dispersant of the formula P-(U-Y)s in which is P is a residue of metal or metal-free phthalocyanine, Y is a compatibilizing moiety with a molecular weight between 500 and 5000 g/mol, U is a linking moiety covalently bonding Y to P, and s is an integer between 1 and 4.

The metal of the phthalocyanine may include but not be limited to copper, aluminum, zinc, and other elements known to produce phthalocyanine complexes. The metal or metal-free phthalocyanine may also contain additional functionality in addition to the compatibilizing moiety with a molecular weight between 500 and 5000 g/mol. Such functionality may include, but not limited to, halogens, short chain alkyl groups, alcohols, amines, esters, for example.

The U linking moiety includes, but is not limited to, —C—, —O—, —S—, —NH—, —COO—, —CONH—, —NHSO$_2$—, —CO—, —N—, $C_{1-4}$-alkyl, for example and combinations thereof.

The Y compatibilizing moiety can be of any structure with a molecular weight between 500 and 5000 g/mol. The Y compatibilizing moiety maybe in the form of a repeating monomer or copolymer unit and be defined therefore as polymeric, but does not have to be polymeric. Representative moieties applicable to the Y moiety include, but not limited to, polyalkylene, polyalkylene oxide, polyetheramine, polyester, polyamine, polyamide, polystyrene, polyvinyl chloride), polyurethanes and other systems that provide compatibility to the host matrix.

A partial list of commercially available materials suitable for providing the Y compatibilizing moiety is: polyetheramines such as the Jeffamine® series of such compounds from Huntsman Chemical such as Jeffamine® M-600, M-1000, M-2005, M-2070, D-230, D-400, D-2000, D-4000, HK-511, ED-600, ED-900, ED-2003, EDR-148, EDR-176, T-403, T-3000, T-5000, and XTJ-436; and polyamines such as the Jeffamine® series such as Jeffamine® SD-231, SD-401, SD-2001, and ST-404, and the BASF products PolyTHF® and Kerocom® PIBA.

The Y compatibilizing moiety may also contain additional reactive functional sites allowing further interaction to occur with the host matrix. Examples of such molecules include but not limited to JEFFAMINE® EDR-148, EDR-176, T-403, T-3000, and T-5000.

The Y compatibilizing moiety may be linear or branched and combinations thereof. It may also contain groups that can further interact with the carbon nanotubes via n-n, dipole-dipole, or donor-acceptor interactions, as known in the art. The number "s" can be varied between 1 and 4 and preferably is 2 or less.

The dispersants used in this invention may be prepared by any conventional method. Illustrative methods for preparing the dispersants described herein are disclosed in U.S. Pat. Nos. 4,946,508; 4,946,509; 5,024,698; and 5,062,894 and in the Examples below.

The following is just one example of a dispersant in accordance with this invention:

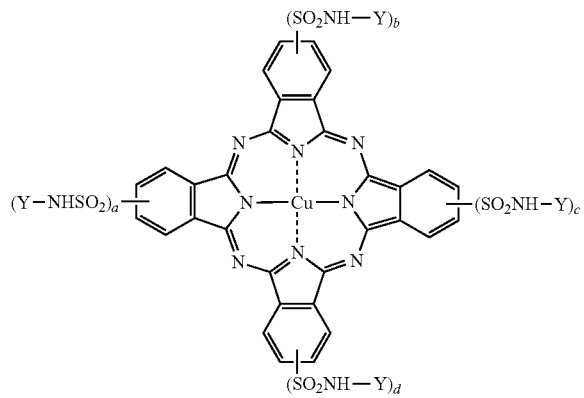

in which Y is a polyalkylene oxide or polyalkylene moiety of the formula:

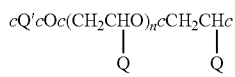

wherein n is about 4 to about 400, and a, b, c and d are integers which total 1 to 4, Q is H, $CH_3$ or a combination thereof; and Q' is a $C_1$-$C_6$ alkyl moiety.

The weight/weight ratio of inventive P-(U-Y)$_s$ dispersant to carbon nanotube is dependant upon the type, source, and treatment level of the carbon nanotube, the molecular weight of Y and value of integer s. For MWCNTs, the ratio is generally between 0.01 to 2 and preferably between 0.05 to 1. For DWCNTs, the ratio is generally between 0.1 and 40 and preferably between 0.2 and 20. For SWCNTs, the ratio is generally between 0.5 and 100 and preferably between 1 and 60.

Nanotube Dispersion Processes

A preferred method of forming a dispersion of carbon nanotubes in the solvent using the inventive dispersant is by sonication. For example, a given amount of CNT understudy is added to a given solvent containing the inventive dispersant and subjected to sonication for a given period of time. Typically the sonicator can be a bath sonicator, such as those by Branson, or a sonicating horn design from companies such as Hielscher Inc. or Misonix, Inc.

Another preferred method of forming a dispersion of carbon nanotubes in the solvent using the inventive dispersant is by media milling. For example, a given amount of CNT under study is added to a given solvent containing the inventive dispersant and subjected to the media milling process for a given period of time. Examples of media milling technology includes ball mills, circulation mills (optionally with centrifugal flow), internally agitated high energy media mills (such as the SDM-series attritors from Union Process, Akron, Ohio or PRK batch attritors from Netzsch Fine Particle Technology, Exton, Pa.), continuous attritors, horizontal or vertical disc mills, basket mills and Perl Mills (from Buhler AG, Uzwil, Switzerland).

Another preferred method of preparing a dispersion of carbon nanotubes in the solvent using the inventive dispersant is by high shear mixing. Apparatus such as a Dispermat with appropriate blade, a homogenizer, or a rotostat are applicable for preparation of such dispersions.

A preferred method of preparing a dispersion of CNTs directly in to a polymeric host using the inventive dispersant is melt mixing. Depending upon the system, the melting mixing may or may not require a small amount of solvent to be present. Apparatus made by companies such as those produced by Brabender GmbH & Co. and Xaloy, Inc. are applicable.

Any other known method of preparing carbon nanotubes dispersions either in solvent or in solid matrix are further methods of this invention. The amount of time required to obtain a satisfactory dispersion utilizing the methods described above is dependent on parameters such as carbon nanotubes loading and type, matrix, type of equipment and can therefore range from seconds to hours.

Nanotube Dispersion Media

The dispersion or solubilization solvent may be organic or aqueous, such as, for example, water, chloroform, chlorobenzene, water, acetic acid, acetone, acetonitrile, aniline, benzene, benzonitrile, benzyl alcohol, bromobenzene, bromoform, 1-butanol, 2-butanol, carbon disulfide, carbon tetrachloride, cyclohexane, cyclohexanol, decalin, dibromethane, diethylene glycol, diethylene glycol ethers, diethyl ether, diglyme, dimethoxymethane, N,N-dimethylformamide, ethanol, ethylamine, ethyl benzene, ethylene glycol ethers, ethylene glycol, ethylene glycol acetates, propylene glycol, propylene glycol acetates, ethylene oxide, formaldehyde, formic acid, glycerol, heptane, hexane, iodobenzene, mesitylene, methanol, methoxybenzene, methylamine, methylene bromide, methylene chloride, methylpyridine, morpholine, naphthalene, nitrobenzene, nitromethane, octane, pentane, pentyl alcohol, phenol, 1-propanol, 2-propanol, terpineol, texanol, carbitol, carbitol acetate, butyl carbitol acetate, dibasic ester, propylene carbonate, pyridine, pyrrole, pyrrolidine, quinoline, 1,1,2,2-tetrachloroethane, tetrachloroethylene, tetrahydrofuran, tetrahydropyran, tetralin, tetra methylethylenediamine, thiophene, toluene, 1,2,4-trichlorobenzene, 1,1,1-trichloroethane, 1,1,2-trichloroethane, trichloroethylene, triethylamine, triethylene glycol dimethyl ether, 1,3,5-trimethylbenzene, m-xylene, o-xylene, p-xylene, 1,2-dichlorobenzene, 1,3-dichlorobenzene, 1,4-dichlorobenzene, 1,2-dichloroethane, N-methyl-2-pyrrolidone, methyl ethyl ketone, dioxane, or dimethyl sulfoxide. In certain embodiments of the present invention, the solvent is a halogenated organic solvent such as 1,1,2,2-tetrachloroethane, chlorobenzene, chloroform, methylene chloride, 1,2-dichloroethane or chlorobenzene.

Nanotube Isolation and Redispersion

Dispersant treated CNT solids can be obtained from the dispersions/solutions by removing the solvent by one of many standard procedures well known to those of ordinary skill in the art and is an embodiment of the present invention. Such standard procedures include drying by evaporation, such as by evaporation under vacuum or evaporation with heat, casting, precipitation or filtration and the like. For precipitating dispersant treated CNTs, a liquid which has a polarity that is opposite to the polarity of compatibilizing moiety on the functionalized metal or metal-free phthalocyanine can be used. The solid material is often black in color with a uniform network of carbon nanotubes. The solid material may be pulverized to produce a powder.

A solid dispersant treated CNT material has advantages over dispersions/solutions of CNTs such as easier shipping, handling, storage, and a longer shelf life.

The solid dispersant treated CNT material may also be used to aid in the incorporation of the CNT in to a host matrix. The host matrix maybe a polymer, a ceramic, a metal, a metal oxide, and combinations thereof. A host matrix (polymer or non-polymer) containing solid dispersant treated CNT material comprising solid dispersant treated CNT material as described herein is an embodiment of the present invention.

The solid dispersant treated CNTs obtained described above can be re-dispersed or re-solubilized by mixing the solid dispersant treated CNT materials with a re-dispersion or re-solubilization solvent. The term "mixing," as used herein for re-dispersion or re-solubilization, means that the solid dispersant treated CNT material and the re-dispersion or re-solubilization solvent are brought into contact with each other. "Mixing" for re-solubilization may include simply vigorous shaking, high shear mixing, or may include sonication for a period of time of about 30 seconds to about 3 hours.

The re-dispersion or re-solubilization solvent may be the same solvent as the dispersion or solubilization solvent or may be a different solvent. Accordingly, the re-dispersion solvent may be organic or aqueous such as, for example, water, chloroform, chlorobenzene, water, acetic acid, acetone, acetonitrile, aniline, benzene, benzonitrile, benzyl alcohol, bromobenzene, bromoform, 1-butanol, 2-butanol, carbon disulfide, carbon tetrachloride, cyclohexane, cyclohexanol, decalin, dibromethane, diethylene glycol, diethylene glycol ethers, diethyl ether, diglyme, dimethoxymethane, N,N-dimethylformamide, ethanol, ethylamine, ethylbenzene, ethylene glycol ethers, ethylene glycol, ethylene oxide, formaldehyde, formic acid, glycerol, heptane, hexane, iodobenzene, mesitylene, methanol, methoxybenzene, methylamine, methylene bromide, methylene chloride, methylpyridine, morpholine, naphthalene, nitrobenzene, nitromethane, octane, pentane, pentyl alcohol, phenol, 1-propanol, 2-propanol, pyridine, pyrrole, pyrrolidine, quinoline, 1,1,2,2-tetrachloroethane, tetrachloroethylene, tetrahydrofuran, tetrahydropyran, tetralin, tetramethylethylenediamine, thiophene, toluene, 1,2,4-trichlorobenzene, 1,1,1-trichloroethane, 1,1,2-trichloroethane, trichloroethylene, triethylamine, triethylene glycol dimethyl ether, 1,3,5-trimethylbenzene, m-xylene, o-xylene, p-xylene, 1,2-dichlorobenzene, 1,3-dichlorobenzene, 1,4-dichlorobenzene, 1,2-dichloroethane, N-methyl-2-pyrrolidone, methyl ethyl ketone, dioxane, or dimethyl sulfoxide. In certain embodiments of the present invention, the re-dispersion solvent is a halogenated organic solvent such as 1,1,2,2-tetrachloroethane, chlorobenzene, chloroform, methylene chloride, or 1,2-dichloroethane and, in further embodiments, the re-dispersion solvent is chlorobenzene.

The dispersion of re-dispersed solid dispersant treated CNT material combining solid dispersant treated CNT material and a re-dispersion solvent is an embodiment of the present invention.

The Host Polymer Matrix

The term "host polymer matrix," as used herein, means a polymer matrix within which the treated CNT is dispersed. A host polymer matrix may be an organic polymer matrix or an inorganic polymer matrix, or a combination thereof.

Examples of a host polymer matrix include a nylon, polyethylene, epoxy resin, polyisoprene, SBS rubber, polydicyclopentadiene, polytetrafluoroethylene, poly(phenylene sulfide), poly(phenylene oxide), silicone, polyketone, aramid, cellulose, polyimide, rayon, poly(methyl methacrylate), poly(vinylidene chloride), poly(vinylidene fluoride), carbon fiber, polyurethane, polycarbonate, polyisobutylene, polychloroprene, polybutadiene, polypropylene, polyvinyl chloride), poly(ether sulfone), polyvinyl acetate), polystyrene, polyester, polyvinylpyrrolidone, polycyanoacrylate, polyacrylonitrile, polyamide, poly(aryleneethynylene), poly(phenyleneethynylene), polythiophene, thermoplastic, thermoplastic polyester resin (such as polyethylene terephthalate), thermoset resin (e.g., thermosetting polyester resin or an epoxy resin), polyaniline, polypyrrole, or polyphenylene such as PARMAX®, for example, other conjugated polymers (e.g., conducting polymers), or a combination thereof.

Further examples of a host polymer matrix includes a thermoplastic, such as ethylene vinyl alcohol, a fluoroplastic such as polytetrafluoroethylene, fluoroethylene propylene, perfluoroalkoxyalkane, chlorotrifluoroethylene, ethylene chlorotrifluoroethylene, or ethylene tetrafluoroethylene, ionomer, polyacrylate, polybutadiene, polybutylene, polyethylene, polyethylenechlorinates, polymethylpentene, polypropylene, polystyrene, polyvinylchloride, polyvinylidene chloride, polyamide, polyamide-imide, polyaryletherketone, polycarbonate, polyketone, polyester, polyetheretherketone, polyetherimide, polyethersulfone, polyimide, polyphenylene oxide, polyphenylene sulfide, polyphthalamide, polysulfone, or polyurethane. In certain embodiments, the host polymer includes a thermoset, such as allyl resin, melamine formaldehyde, phenol-formaldehyde plastic, polyester, polyimide, epoxy, polyurethane, or a combination thereof.

Examples of inorganic host polymers include a silicone, polysilane, polycarbosilane, polygermane, polystannane, a polyphosphazene, or a combination thereof.

The term "host nonpolymer matrix," as used herein, means a nonpolymer matrix within which the dispersant treated CNT is dispersed. Examples of host nonpolymer matrices include a ceramic matrix (such as silicon carbide, boron carbide, or boron nitride), a metal matrix (such as aluminum, titanium, iron, or copper), or a metal oxide matrix (such as silica, titania, alumina, zirconia), or a combination thereof.

The term "host energy curable matrix," as used herein, means a vehicle characterized in that it is curable to a solid by exposure to energy from a radiant or thermal energy source.

The radiation curable vehicle typically comprises one or more low molecular weight mono-functional or multi-functional monomers. These components may react with the monomers upon curing. The energy curable vehicle is characterized in that it is curable to a solid by exposure to energy from a radiant or thermal energy source. The vehicle may be cured to a solid by exposure to energy, such as exposure to high energy electrons from an electron beam source. Alternatively, curing of the vehicle may be initiated by energy activation of a polymerization initiating system (e.g. by UV radiation) as will be described in detail herein below. In this context, a polymerization initiating system may be considered an optional component of the energy curable vehicle. The vehicle may be a ring opening polymerizable composition, a free radical addition polymerizable composition, or by a combination of ring opening and free radical polymerization. In either composition, the vehicle is cured or hardened by polymerizing and/or crosslinking, at least the reactive monomers of the liquid vehicle. In order to reduce environmental contamination and maintain formulation integrity, the vehicle is typically formulated with components having low volatility under ambient printing conditions.

When the vehicle is a ring opening polymerizable composition, it forms a polymer typically bound by ester, or ether linkages upon energy initiation.

An embodiment of the invention is a cationic polymerizable system comprising one or more mono-functional or multi-functional epoxides. The vehicles typically contain at least one cycloaliphatic epoxide. Examples of such cycloaliphatic epoxides are adducts of epoxides and hydroxyl components such as glycols, polyols, or vinyl ether, such as 3,4-epoxycyclohexylmethyl 3,4-epoxy-cyclohexane carboxylate; bis(3,4-epoxy-cyclohexyl-methyl)adipate; limonene monoepoxide; limonene diepoxide; diglycidyl ester of hexahydrophthalic acid; 1-vinyl-3,4-epoxycyclohexane; epoxidated dicyclopentyl alcohol; or a mixture thereof. A preferred cycloaliphatic epoxides of this type is 3,4-epoxycyclohexylmethyl 3,4-epoxy-cyclo-hexylcarboxylate; 1,3-bis(2-(7-oxabicyclo(4.1.0)hepta-3-y-l)ethyl)-1,1,3,3-tetramethyldisiloxane. In addition to the cycloaliphatic epoxides there may be one or more non-cycloaliphatic epoxides, such as di- or tri-glycidyl ether, alkoxylated bisphenol A, 1,6-hexane diol, glycerol; neopentylglycol; or trimethylolpropane. The epoxy diluent likewise may be diglycidyl ether of bisphenol A; an alpha-olefin epoxide, a novolak epoxide, epoxidated linseed oil, soy oil; epoxidated polybutadiene; 1,2-epoxydecane; caprolactone triol; glycidyl ether; alkyl glycidylether; epoxidated silanes; glycidoxy-methoxy silane; and glycidoxy-ethoxy silane; 2-ethylhexytglycidyl ether. Such epoxy compositions typically contain a cationic initiating system activatable by actinic radiation. A preferred epoxy diluent is 2-ethylhexylglycidyl ether.

When the energy curable vehicle is a free radical addition polymerizable composition, the vehicle comprises a compound having terminal ethylenic unsaturation. Typically, the vehicle is a free radical addition polymerizable system comprising an ethylenically unsaturated mono- or multi-functional monomer. The monomer is a lower molecular weight ethylenically unsaturated compound which forms a polymer directly upon initiation by free radicals generated by absorbed energy. In some formulations, an oligomeric or polymeric component which can be further polymerized may also be present. In such cases, the further polymerizable material will be soluble in, or dispersible in the monomer vehicle.

Typically, the monomeric compounds have one, two, or more terminal ethylenically unsaturated groups. Representative of such monomeric compounds are: N-vinyl pyrrolidinone; dipropylene glycol diacrylate; tripropylene glycol diacrylate; butanediol diacrylate; hexanediol diacrylate; trimethylol propane triacrylate; ethoxylated trimethylol propane triacrylate; glycerol-propoxy triacrylate; pentaerythritol triacrylate; dipropylene glycol dimethacrylate; tripropylene glycol dimethacrylate; butanediol dimethacrylate; hexanediol dimethacrylate; trimethylol propane trimethacrylate; di-(3-methacryloxy-2-hydroxypropyl ether) of bisphenol-A; di(2-methacryloxyethyl ether) of bisphenol-A; di-(3-acryloxy-2-hydroxypropyl ether) of bisphenol-A; di(2-acryloxyethyl ether) of bisphenol-A; and the like.

To achieve the desired viscosity and crosslinking properties, the monomer composition typically contains a combination of multifunctional acrylic monomers along with a monomer containing a single terminal ethylenic group.

When the composition of this invention contains an oligomeric or polymeric material, said materials typically possess ethylenic unsaturation which can react with the ethylenically unsaturated monomers. Representative of such oligomers are acrylated epoxy resins; acrylated polyurethanes; acrylated polyesters; and the like.

The compositions of the present invention may also contain a preformed polymer such as an acrylic polymer or copolymer of $C_1$-$C_4$ alkyl acrylates or methacrylates, or acrylic or methacrylic acid, vinyl polymers and copolymers such as polyvinyl chloride, polyvinyl acetate, polyvinyl alcohol, polyvinylpyrrolidone, cellulosic polymers and copolymers; and the like.

Unless the composition is formulated specifically for use with EB curing, it will contain a polymerization initiating system activatable by actinic radiation, such as UV or thermal radiation. Such a photoinitiator system has one or more compounds that directly furnish cations or free radicals when activated by actinic radiation.

UV cationic polymerization initiating systems typically are used to initiate ring opening polymerization in systems such as the epoxy compositions described herein. Such cationic initiating systems include all substances which liberate Lewis acids or Broensted acids upon exposure to actinic radiation. Cationic photoinitiating systems which are particularly useful in energy curable composition are arylsulfonium salts, especially a triarylsulfonium salt such as triarylsulfonium phosphate, triarylsulfonium antimonate, triphenylsulfonium hexafluorophosphate, and diarylsulfonium salt; and aryliodonium salts, such as diaryliodonium hexafluoroantimonate, bisdodecyldiphenyliodonium hexafluoroantimnoate, iodonium tetrakis (pentafluorophenyl) borate, and the like. Such cationic photoinitiators may be used individually or in combination to effect suitable curing.

In thermal cationic polymerization initiating systems, a blocked acid is typically used because it does not initiate the ring opening polymerization of epoxies until it is unblocked. Thermal irradiation unblocks the acid and generates a strong acid, which starts the epoxy ring opening polymerization. Some examples of "blocked" acids are Nacure TLC 1412 (King Industries), FC-122 and FC-520 (Available from 3M, St. Paul, Minn.), and CP-66. (Available from Ciba, White Plains, N.Y.).

Free radical polymerization initiating systems may also be used and typically require irradiation of a photoinitiator to produce free radicals that initiate polymerization. A wide variety of these photoinitiators may be used in the energy curable inks of this invention. A few are described, for example, by B. M. Monroe and G. C. Weed in Photoinitiators for Free-Radical-Initiated Photo-Imaging Systems, Chem. Rev. 93, pp. 435-48 (1993), incorporated herein by reference. Examples of photoinitiators include thioxanthone, ethyl 4-(dimethyl-amino) benzoate, alpha amino acetophenone, and Michler's ketone.

Nanocomposites can themselves be used as a host matrix to form a multifunctional nanocomposite upon the addition of the dispersant treated CNT. Examples of a nanocomposite host include: continuous fibers (such as carbon fibers, carbon nanotube fibers, carbon black, carbon rods, carbon nanotube nanocomposite fibers, KEVLAR® fibers, ZYLON® fibers, SPECTRA® fibers, nylon fibers, VECTRAN® fibers, Dyneema fibers, glass fibers, or a combination thereof, for example), discontinuous fibers (such as carbon fibers, carbon nanotube fibers, carbon nanotube nanocomposite fibers, KEVLAR® fibers, ZYLON® fibers, SPECTRA® fibers, nylon fibers, or a combination thereof, for example), nanoparticles (such as metallic particles, polymeric particles, ceramic particles, nanoclays, diamond particles, or a combination thereof, for example), and microparticles (such as metallic particles, polymeric particles, ceramic particles, clays, diamond particles, or a combination thereof, for example). In a further embodiment, the continuous fiber, discontinuous fiber, nanoparticle, microparticle, macroparticle, or combination thereof, is a primary filler and the exfoliated nanomaterial is a secondary filler.

More than one host matrix may be present in a nanocomposite. By using more than one host matrix, mechanical, thermal, chemical, or electrical properties of a single host matrix nanocomposite are optimized by adding the dispersant treated CNTs to the matrix of the nanocomposite material.

A number of existing materials use continuous fibers, such as carbon fibers, in a matrix. These fibers are much larger than carbon nanotubes. The addition of a dispersant treated CNTs to the matrix of a continuous fiber reinforced nanocomposite results in a multifunctional nanocomposite material having improved properties such as improved impact resistance, reduced thermal stress, reduced microcracking, reduced coefficient of thermal expansion, or increased transverse or through-thickness thermal conductivity. The resulting advantages of multifunctional nanocomposite structures include improved durability, improved dimensional stability, elimination of leakage in cryogenic fuel tanks or pressure vessels, improved through-thickness or in-plane thermal conductivity, increased grounding or electromagnetic interference (EMI) shielding, increased flywheel energy storage, or tailored radio frequency signature (Stealth), for example. Improved thermal conductivity also could reduce infrared (IR) signature. Nanocomposites as provided herein are also useful for flame retardant materials, materials with improved optical properties, materials for x-ray shielding, materials for anti-microbial uses, materials for chemical/environmental resistance, and materials for sensing.

End Uses of Dispersant Treated CNTs

The inventive dispersant treated CNT dispersion can be utilized in the formation of inks and coatings. Such composition may include additives such as resins, colorants, wetting agents, fillers, etc., used to achieve the desired end use properties, as known in the art. Methods of applying the composition to a substrate to form a conductive layer include coating, spraying, printing, and painting. Printing techniques applicable to this composition include letterpress, screen, rotary screen, gravure, lithography, inkjet, intaglio, and flexographic printing. The composition can be applied to various types of cellulosic substrates (i.e. paper, cardboard) and plastics such as polyesters, polypropylenes, etc.

After being applied to the substrate, liquid compositions of the invention can be dried using a number of techniques and methods known in the field. For items prepared using a printing technique, the press can be equipped with IR dryers, forced hot air blowers, annealing rollers, or microwave units to remove the solvent and cure/anneal the layer. Alternatively, the printed item could be partially dried on press and then either placed in a drying oven or routed through another drying system to further cure/anneal the composition.

The inventive dispersant treated CNT can be incorporated into a host matrix to impart improved properties. Depending upon the type of CNT utilized and its loading level properties such as electrical conductivity, thermal conductivity, modules, tear strength, fracture strength, stiffness, hardness, and combinations thereof can be improved.

An article of manufacture including the inventive dispersant-treated CNTs as set forth herein is an embodiment of the present invention. The dispersant-treated CNTs can be incorporated in to the article of manufacture as a dispersion, as a re-dispersed solid, or as a solid, and combinations thereof at any point in the manufacture of such item or component of such item. Such articles of manufacture include, for example, epoxy and engineering plastic composites, filters, actuators, adhesive composites, elastomer composites, materials for thermal management (interface materials, spacecraft radiators, avionic enclosures and printed circuit board thermal planes, materials for heat transfer applications, such as coatings, for example), aircraft, ship infrastructure and automotive structures, improved dimensionally stable structures for spacecraft and sensors, materials for ballistic applications such as panels for air, sea, and land vehicle protection, body armor, protective vests, and helmet protection, tear and wear resistant materials for use in parachutes, for example, reusable launch vehicle cryogenic fuel tanks and unlined pressure vessels, fuel lines, packaging of electronic, optoelectronic or microelectromechanical components or subsystems, rapid prototyping materials, fuel cells, medical materials, composite fibers, improved flywheels for energy storage, sporting and consumer goods, O-rings, gaskets, or seals, for example.

The dispersant-treated CNT material can be utilized in a photovoltaic device or an energy storage device such as a battery, capacitor, or super capacitor. The material can also be utilized in a transparent conductive film as disclosed in U.S. Pat. Nos. 7,265,174 and 7,060,241.

The following examples are presented to further illustrate various aspects of the present invention, and are not intended to limit the scope of the invention. Unless otherwise specified, all temperatures are in degrees Centigrade and all parts and percentages are by weight.

EXAMPLE 1

Dispersant A was prepared by charging a presscake containing 210 parts by weight of copper phthalocyanine sulfonyl chloride (which may be made by any conventional method) into a mixture of 692 parts by weight of a primary amine-terminated poly(ethylene oxide/propylene oxide) (6/29) copolymer having a number average molecular weight of approximately 2000 (available as Jeffamine M-2005 from Huntsman Corporation) and 66 parts by weight of sodium carbonate and mixed. The final reaction mixture was then heated to 80-90 C under vacuum to remove water to produce dispersant A.

To a 20 mL scintavial were added 10.0 mg of NanoBlack II (MWCNTs, Columbian Chemical Corp.) and 4.0 mg of Dispersant A in 15 mL of ethyl acetate. The mixture was allowed to stand for 1 h to allow Dispersant A to dissolve in the ethyl acetate resulting in a deep blue solution with the black particles of NanoBlack II present at the bottom of the vial. The scintvial was then placed in a Branson 2510 bath sonicator and sonicated at maximum power for 90 min. After 90 min, the sonication bath water was replaced with tap water and sonication repeated for a second 90 min interval. The resulting dark black solution was centrifuged at 10,000 RPM for 30 min on a K Prima-15R centrifuge (Composite Rotor, Inc.). The dispersion remained black in color with a small amount of sediment present in the bottom of the centrifuge tube. The presence of dispersed CNTs in the ethyl acetate was confirmed by scanning electron microscopy of a dried sample of the supernatant. The presence of Dispersant A absorbed on the surface of the NanoBlack II is evident by the greasy appearance of the MWCNTs compared to images obtained on the starting MWCNT powder. The decanted CNT dispersion had greater than 1 week stability.

EXAMPLE 2

To a 20 mL scintivial were added 10.0 mg of NanoBlack II (MWCNTs) and only 2.5 mg of Dispersant A in 15 mL of ethyl acetate. The mixture was allowed to stand for 1 h to allow Dispersant A to dissolve in the ethyl acetate resulting in a deep blue solution with the black particles of NanoBlack II present at the bottom of the vial. The scintivial was then placed in a Branson 2510 bath sonicator and sonicated at maximum power for 90 min. After 90 min., the sonication bath water was replaced with tap water and sonication repeated for a second 90 min interval. After standing for 1 h, the scintivial solution was clear except for black sediment at the bottom. The absence of the deep blue color from Dispersant A in the scintivial after sonication and centrifugation is consistent with strong absorption of Dispersant A on to the NanoBlack II but at an amount below that necessary to disperse NanoBlack II in ethyl acetate.

EXAMPLE 3

Comparative

To a 20 mL scintivial were added 10.0 mg of NanoBlack II (MWCNTs) to 15 mL of ethyl acetate. The scintivial was then placed in a Branson 2510 bath sonicator and sonicated at maximum power for 90 min. After 90 min, the sonication bath water was replaced with tap water and sonication repeated for a second 90 min interval. After the second sonication, there was no indication of CNT dispersion with only black particles present at the bottom of the vial.

EXAMPLE 4

To a 20 mL scintavial were added 4.3 mg of Elicarb MWCNTs (Thomas Swan & Co.) and 2.1 mg of Dispersant A in 15 mL of ethyl acetate. The mixture was allowed to stand for 1 h to allow Dispersant A to dissolve in the ethyl acetate resulting in a deep blue solution with the black particles of Elicarb MWCNTs present at the bottom of the vial. The scintivial was then placed in a Branson 2510 bath sonicator and sonicated at maximum power for 90 min. After 90 min, the sonication bath water was replaced with tap water and sonication repeated for a second 90 min interval. The resulting dark black solution was centrifuged at 10,000 RPM for 30 min on a K Prima-15R centrifuge (Composite Rotor, Inc.). The dispersion remained black in color with a small amount of sediment present in the bottom of the centrifuge tube. The presence of dispersed CNTs in the ethyl acetate was confirmed by scanning electron microscopy of a dried sample of the supernatant. The presence of Dispersant A absorbed on the surface of the Elicarb MWCNTs is evident by the greasy appearance of the MWCNTs compared to images obtained on the starting MWCNT powder. The decanted CNT dispersion had greater than 1 week stability.

EXAMPLE 5

To a 20 mL scintivial were added 4.3 mg of Elicarb MWCNTs (Thomas Swan & Co.) and 1.2 mg of Dispersant A in 15 mL of ethyl acetate. The mixture was allowed to stand for 1 h to allow Dispersant A to dissolve in the ethyl acetate resulting in a deep blue solution with the black particles of Elicarb MWCNTs present at the bottom of the vial. The scintivial was then placed in a Branson 2510 bath sonicator and sonicated at maximum power for 90 min. After 90 min, the sonication bath water was replaced with tap water and sonication repeated for a second 90 min interval. After standing for 1 h, the scintivial solution was clear except for black sediment at the bottom. The absence of the deep blue color from Dispersant A in the scintivial after sonication and centrifugation is consistent with strong absorption of Dispersant A on to the Elicarb MWCNTs but at an amount below that necessary to disperse Elicarb MWCNTs in ethyl acetate.

EXAMPLE 6

Comparative

To a 20 scintivial were added 4.3 mg of Elicarb MWCNTs (Thomas Swan & Co.) to 15 mL of ethyl acetate. The scintivial was then placed in a Branson 2510 bath sonicator and sonicated at maximum power for 90 min. After 90 min, the sonication bath water was replaced with tap water and sonication repeated for a second 90 min interval. After the second sonication, there was no indication of CNT dispersion with only black particles present at the bottom of the vial.

EXAMPLE 7

To a 20 mL scintavial were added 20.0 mg of Nanocyl 2100 DWCNTs and 20.0 mg of Dispersant A in 15 mL of ethyl acetate. The mixture was allowed to stand for 1 h to allow Dispersant A to dissolve in the ethyl acetate resulting in a deep blue solution with the black particles of Nanocyl 2100 DWCNTs present at the bottom of the vial. The scintivial was then placed in a Branson 2510 bath sonicator and sonicated at maximum power for 90 min. After 90 min, the sonication bath water was replaced with tap water and sonication repeated for a second 90 min interval. The resulting dark black solution was centrifuged at 10,000 RPM for 30 min on a K Prima-15R centrifuge (Composite Rotor, Inc.). The dispersion remained black in color with a small amount of sediment present in the bottom of the centrifuge tube. The decanted DWCNT dispersion had greater than 1 week stability.

EXAMPLE 8

To a 20 mL scintivial were added 20 mg of Nanocyl 2100 DWCNTs and 11 mg of Dispersant A in 15 mL of ethyl acetate. The mixture was allowed to stand for 1 h to allow Dispersant A to dissolve in the ethyl acetate resulting in a deep blue solution with the black particles of Nanocyl 2100 DWCNTs present at the bottom of the vial. The scintivial was then placed in a Branson 2510 bath sonicator and sonicated at maximum power for 90 min. After 90 min, the sonication bath water was replaced with tap water and sonication repeated for a second 90 min interval. After standing for 1 h, the scintivial solution was clear except for black sediment at the bottom. The absence of the deep blue color from Dispersant A in the scintivial after sonication and centrifugation is consistent with strong absorption of Dispersant A on to the Nanocyl 2100 DWCNTs but at an amount below that necessary to disperse Nanocyl 2100 DWCNTs in ethyl acetate.

EXAMPLE 9

Comparative

To a 20 mL scintivial were added 20 mg of Nanocyl 2100 DWCNTs to 15 mL of ethyl acetate. The scintivial was then placed in a Branson 2510 bath sonicator and sonicated at maximum power for 90 min. After 90 min, the sonication bath water was replaced with tap water and sonication repeated for a second 90 min interval. After the second sonication, there was no indication of DWCNT dispersion with only black particles present at the bottom of the vial.

EXAMPLE 10

Dispersant B was produced by a similar procedure to that used to prepare dispersant A but the poly(ethylene oxide/propylene oxide) copolymer had a 31 to 10 ratio of ethylene oxide to propylene oxide units with a number average molecular weight of approximately 2000 (available as Jeffamine M-2070 from Huntsman Corporation).

To a 20 mL scintavial were added 34.0 mg of NanoBlack II (MWCNTs) and 35.0 mg of Dispersant B in 15 mL of n-propyl alcohol. The mixture was allowed to stand for 1 h to allow Dispersant B to dissolve in the n-propyl alcohol resulting in a deep blue solution with the black particles of NanoBlack II present at the bottom of the vial. The scintvial was then placed in a Branson 2510 bath sonicator and sonicated at maximum power for 90 min. After 90 min, the sonication bath water was replaced with tap water and sonication repeated for a second 90 min interval. The resulting dark black solution was centrifuged at 10,000 RPM for 30 min on a K Prima-15R centrifuge (Composite Rotor, Inc.). The dispersion remained black in color with a small amount of sediment present in the bottom of the centrifuge tube. The decanted CNT dispersion had greater than 1 week stability.

EXAMPLE 11

To a 20 mL scintivial were added 34.0 mg of NanoBlack II (MWCNTs) and 18 mg of Dispersant B in 15 mL of n-propyl alcohol. The mixture was allowed to stand for 1 h to allow Dispersant B to dissolve in the n-propyl alcohol resulting in a deep blue solution with the black particles of NanoBlack II present at the bottom of the vial. The scintivial was then placed in a Branson 2510 bath sonicator and sonicated at maximum power for 90 min. After 90 min, the sonication bath water was replaced with tap water and sonication repeated for a second 90 min interval. After standing for 1 h, the scintivial solution was clear except for black sediment at the bottom. The absence of the deep blue color from Dispersant B in the scintivial after sonication and centrifugation is consistent with strong absorption of Dispersant B on to the NanoBlack II but at an amount below that necessary to disperse NanoBlack II in n-propyl alcohol.

EXAMPLE 12

Comparative

To a 20 mL scintivial were added 10.0 mg of NanoBlack II (MWCNTs) to 15 mL of n-propyl alcohol. The scintivial was then placed in a Branson 2510 bath sonicator and sonicated at maximum power for 90 min. After 90 min, the sonication bath water was replaced with tap water and sonication repeated for a second 90 min interval. After the second sonication there was no indication of CNT dispersion with only black particles present at the bottom of the vial.

EXAMPLE 13

Solsperse 5000 (Noveon, Inc.) is a quaternary salt of a copper phthalocyanine derivative. To determine that it by itself does not disperse SWCNTs in water, the following experiment was conducted in which the SWCNT utilized was Elicarb SWCNTs from Thomas Swan & Co. and provided as a 1.56 wt % SWCNT aqueous paste.

To a 4 oz. glass jar was added 0.31 g of Elicarb SWCNT paste (4.8 mg SWCNTs) and 100 mL of Dl water. To a second 4 oz. glass jar was added 0.31 g of Elicarb SWCNT paste (4.8 mg SWCNTs), 200 mg of Dispersant B, and 100 mL of Dl water. To a third 4 oz. glass jar was added 0.31 g of Elicarb SWCNT paste (4.8 mg SWCNTs), 200 mg Solsperse 5000, and 100 mL of Dl water. After standing for 1 h, each vial was sonicated for 16 min using a Hielscher UIP1000hd ultrasonic processor using a 18 mm ultrasonication probe at 100% amplitude. After sonication, 15 g of each of the 3 solutions were placed in a 20 mL sonication vial and centrifuged for 30 min on a DYNAC centrifuge (Becton Dickinson, Inc.). After sonication, the vial containing no dispersant had only black sediment present, the vial containing Dispersant B was deep black in color with no sediment present, and the vial with Solsperse 5000 had a faint blue color and black sediment present. These results demonstrate that Solsperse 5000 can not disperse SWCNTs in water even at a 42 to 1 ratio of dispersant to SWCNT.

EXAMPLE 14

Dispersant C was produced by a similar procedure to that used to prepare Dispersants A and B but an amine-terminated polyisobutylene (KEROCOM PIBA-3, molecular weight—1500 g/mol from BASF, Inc.) was utilized.

To determine if Solsperse 5000 by itself does not disperse SWCNTs in naphtha (a hydrocarbon solvent) the following experiment was conducted in which the SWCNT utilized was Elicarb SWCNTs from Thomas Swan & Co. and provided as a 2.54 wt % SWCNT alcohol paste. To a 4 oz. glass jar was added 0.39 g of Elicarb SWCNT paste (9.8 mg SWCNTs) and 100 mL of naphtha. To a second 4 oz. glass jar was added 0.39 g of Elicarb SWCNT paste (9.8 mg SWCNTs), 100 mg of Dispersant C, and 100 mL of naphtha. To a third 4 oz. glass jar was added 0.91 g of Elicarb SWCNT paste (9.8 mg SWCNTs), 100 mg of Solsperse 5000, and 100 mL of naphtha. After standing for 1 h, each vial was sonicated for 16 min using a Hielscher UIP1000hd ultrasonic processor using a 18 mm ultrasonication probe at 100% amplitude. After sonication, 15 g of each of the 3 solutions were placed in a 20 mL sonication vial and centrifuged for 30 min on a DYNAC centrifuge (Becton Dickinson, Inc.). After sonication, the vial containing no dispersant had only black sediment present, the vial containing Dispersant C was deep black in color with no sediment present, and the vial with Solsperse 5000 had a faint blue color and black sediment present. These results demonstrate that Solsperse 5000 can not disperse SWCNTs in naphtha even at a 10 to 1 ratio of dispersant to SWCNT.

EXAMPLE 15

To a 4 oz. glass jar was added 20 mg of Elicarb MWCNT powder and 100 mL of Dl water. To a second 4 oz. glass jar was added 20 mg of Elicarb MWCNT powder, 20 mg of Dispersant B, and 100 mL, of Dl water. To a third 4 oz. glass jar was added 20 mg of Elicarb MWCNT powder, 20 mg Solsperse 5000, and 100 mL of Dl water. After standing for 1 h, each vial was sonicated for 16 min using a Hielscher UIP1000hd ultrasonic processor using a 18 mm ultrasonication probe at 100% amplitude. After sonication, 15 g of each of the 3 solutions were placed in a 20 mL sonication vial and centrifuged for 30 min on a DYNAC centrifuge (Becton Dickinson, Inc.). After sonication, the vial containing no dispersant had only black sediment present, the vial containing Dispersant B was deep black in color with no sediment present, and the vial with Solsperse 5000 had a faint blue color and black sediment present. These results demonstrate that Solsperse 5000 can not disperse MWCNTs in water at a 1 to 1 ratio of dispersant to MWCNT.

EXAMPLE 16

To a 4 oz. glass jar was added 20 mg of Elicarb MWCNT powder and 100 mL of isopropyl alcohol. To a second 4 oz. glass jar was added 20 mg of Elicarb MWCNT powder, 20 mg of Dispersant A, and 100 mL of isopropyl alcohol. To a third 4 oz. glass jar was added 20 mg of Elicarb MWCNT powder, 20 mg Solsperse 5000, and 100 mL of isopropyl alcohol. After standing for 1 h, each vial was sonicated for 16 min using a Hielscher UIP1000hd ultrasonic processor using a 18 mm ultrasonication probe at 100% amplitude. After sonication, 15 g of each of the 3 solutions were placed in a 20 mL sonication vial and centrifuged for 30 min on a DYNAC centrifuge (Becton Dickinson, Inc.). After sonication, the vial containing no dispersant had only black sediment present, the vial containing Dispersant A was deep black in color with no sediment present, and the vial with Solsperse 5000 had a faint blue color and black sediment present. These results demonstrate that Solsperse 5000 can not disperse MWCNTs in isopropyl alcohol at a 1 to 1 ratio of dispersant to MWCNT.

EXAMPLE 17

To demonstrate the applicability of the inventive dispersant system to allow the incorporation on CNTs in to energy curable systems the following experiments were performed. To a 4 oz jar was added 0.30 g of Arkema C100 MWCNTs, 0.15 g of Dispersant B, and 70.1 g of SR344 (Sartomer, Inc., polyethylene glycol (400 g/mol molecular weight) diacrylate). After sitting for 1 h, the solution was sonicated for 6 min using a Hielscher UIP1000hd ultrasonic processor with an 18 mm ultrasonication probe at 100% amplitude. After sonication, the resulting dispersion was centrifuged for 30 min on a DYNAC centrifuge (Becton Dickinson, Inc.). The resulting supernatant was deep black in color with only a small amount of black residue present at the bottom of the vial.

An electron beam curable composition was prepared as follows: 28.0 g of the centrifuged Dispersant B/Arkema C100/SR344 dispersion was added to 28.0 g of CN132 (Sartomer, Inc., a low viscosity diacrylate oligomer) and mixed for 1 min. Using a 300 Q handproofer, a layer of the composition was applied to ST505 (DuPont Films, heat stabilized PET) and electron beam cured using a Advanced Electron Beams, Inc. Application Development Unit. The electron beam parameters were: voltage of 1 kV; beam energy of 0.1 mA; energy dose of 30.0 kGy; and speed of 75FPM. After treatment, the composition had formed a tough adhesive film on the ST505.

An ultraviolet curable composition was prepared as follows: 28.0 g of the centrifuged Dispersant B/Arkema C100/SR344 dispersion was added to 28.0 g of CN132 (Sartomer, Inc., a low viscosity diacrylate oligomer) and 4.0 g of Irgacure 819DW (CIBA, Inc., a dispersion of bis-acyl-phosphine in water, 45 (w/w %)) and mixed for 1 min. Using a 300 Q handproofer, a layer of the composition was applied to ST505 (DuPont Films, heat stabilized PET) and irradiation with ultraviolet radiation using a Fusion UV system at 100 PPM. After ultraviolet irradiation, the composition had formed a tough adhesive film on the ST505.

EXAMPLE 18

To a 20 mL scintavial were added 20.0 mg of Nanocyl DWCNTs and 43.0 mg of Dispersant C in 15 mL of heptane. The mixture was allowed to stand for 1 h to allow Dispersant C to dissolve in the heptane resulting in a deep blue solution with the black particles of Nanocyl DWCNTs present at the bottom of the vial. The scintvial was then placed in a Branson 2510 bath sonicator and sonicated at maximum power for 90 min. After 90 min, the sonication bath water was replaced with tap water and sonication repeated for a second 90 min interval. The resulting dark black solution was centrifuged at 10,000 RPM for 30 min on a K Prima-15R centrifuge (Composite Rotor, Inc.). The dispersion remained black in color with a small amount of sediment present in the bottom of the centrifuge tube. The decanted DWCNT dispersion had greater than 1 week stability.

EXAMPLE 19

To a 20 mL scintivial were added 10.0 mg of Nanocyl DWCNTs and 10 mg of Dispersant C in 15 mL of heptane. The mixture was allowed to stand for 1 h to allow Dispersant C to dissolve in the heptane resulting in a deep blue solution with the black particles of Nanocyl DWCNTs present at the bottom of the vial. The scintivial was then placed in a Branson 251.0 bath sonicator and sonicated at maximum power for 90 min. After 90 min, the sonication bath water was replaced with tap water and sonication repeated for a second 90 min interval. After standing for 1 h, the scintivial solution was clear except for black sediment at the bottom. The absence of the deep blue color from Dispersant C in the scintivial after sonication and centrifugation is consistent with strong absorption of Dispersant C on to the Nanocyl DWCNTs but at an amount below that necessary to disperse Nanocyl DWCNTs in heptane.

EXAMPLE 20

Comparative

To a 20 mL scintivial were added 10.0 mg of Nanocyl DWCNTs to 15 mL of heptane. The scintivial was then placed in a Branson 2510 bath sonicator and sonicated at maximum power for 90 min. After 90 min, the sonication bath water was replaced with tap water and sonication repeated for a second 90 min interval. After the second sonication, there was no indication of CNT dispersion with only black particles present at the bottom of the vial.

EXAMPLE 21

To demonstrate the ability of the inventive dispersants to aid in CNT incorporation in to a polymer during melt mixing the following experiments were performed. The resin used in these experiments was Poly-Pale a partially dimerized rosin from Eastman Chemical Corp.

In experiment (1), 99.5 g of Poly-Pale was added to a Brabender Model SA06 No. GT844 SB that had been preheated to 200° F. (ca. 95° C.) The resin was mixed for about 15 min until melted and then 0.5 g of Nanocyl 7000 MWCNT powder was added to the polymer melt and mixed for 1 h to foster MWCNT dispersion. After 1 h, the heater and mixer was turned off and the PolyPale melt containing Nanocyl 7000 was allowed to cool to room temperature to form a black solid. 5.0 g of the resulting MWCNT/PolyPale nanocomposite was dissolved in 10 mL of isopropyl alcohol in a glass vial. The resulting solution contained CNT aggregates large enough to be seen with the unaided eye that coated the sides of the vial. After standing for 2 weeks, the vial had a layer of sediment present.

In experiment (2), the processing conditions and time were nearly identical except that only 99.0 g of PolyPale was used and 0.5 g of Dispersant A was added to the polymer melt at the same time as the 0.5 g of Nanocyl 7000 was added. 5.0 g of the resulting MWCNT/Dispersant A/PolyPale nanocomposite was dissolved in 10 mL of isopropyl alcohol in a glass vial. The resulting solution was deep black in color with almost no indication of the presence of large CNT aggregates. After standing for 2 weeks the vial had nearly no sedimentation present.

While the processing conditions outlined above were not optimized, they clearly demonstrated the applicability of the inventive dispersant system to aid in the production of CNT/polymer nanocomposites in the melt.

EXAMPLE 22

To demonstrate the applicability of high shear mixing to prepare CNT dispersions utilizing the inventive dispersants, the following experiment was performed.

To a 4 oz jar was added 50 mg of Nanocyl 7000 MWCNTs, 100 mg of Dispersant B, and 100 mL of Dl water. After standing for 1 h, the solution was mixed under high shear using a Silverson L2 Model 3877 compressed air powered mixer for 3 h. The resulting black solution was centrifuged for 30 min on a DYNAC centrifuge (Becton Dickinson, Inc.). After centrifugation, the supernatant was deep black in color with no particles seen even under 10× optical magnification although black sediment was present.

Although the present invention and its advantages have been described in detail, it should be understood that various changes, substitutions and alterations can be made. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufactures, compositions of matter, means, methods, or steps, presently existing or later to be developed that perform substantially the same function or achieve substantially the same result as the corresponding embodiments described herein may be utilized according to the present invention.

What is claimed is:

1. A composition comprising a combination of carbon nanotube and a dispersant of the formula P-(U-Y)s in which P is a residue of a metal or metal-free phthalocyanine, Y is a compatibilizing moiety with a molecular weight between 500 and 5000 g/mol, U is a linking moiety covalently bonding Y to P, and s is an integer between 1 and 4.

2. The composition of claim 1, wherein the carbon nanotube is a single wall (SWCNT), doubled wall (DWCNT), multiwall (DWCNT) nanotube or a mixture thereof.

3. The composition of claim 1, wherein the carbon nanotubes is a bamboo carbon nanotube, a carbon fibril, a carbon nanofiber, a vapor grown carbon fibers, or a cylindrical carbon nanotube.

4. The composition of claim 1, wherein the metal in P is copper, aluminum, or zinc.

5. The composition of claim 1, wherein Y is a polyalkylene, polyalkylene oxide, polyester, polyamine, polyamide, polyetheramine, polyimide, polystyrene, poly(vinyl chloride), a polyurethane and a combination thereof.

6. The composition of claim 1, wherein Y comprises a polyalkylene oxide moiety.

7. The composition of claim 1, wherein Y comprises a polyalkylene moiety.

8. The composition of claim 1, wherein the U linking moiety is selected from the group consisting of —C—, —O—, —S—, —N—, —NH—, —COO—, —CONH—, —NHSO$_2$—, —CO—, alkylene or a combination thereof.

9. The composition of claim 1, wherein the combination of carbon nanotube and dispersant is a solid.

10. The composition of claim 9, in combination with a host matrix.

11. The composition of claim 1, in combination with a host matrix.

12. The composition of claim 11, wherein the host matrix is selected from the group consisting of a polymer, a metal, a metal oxide, a ceramic, a solvent, a prepolymer, a radiation curable system or a combination thereof.

13. The composition of claim 12, wherein the host matrix is selected from the group consisting of themoplastic polymer, themoset polymer, thermosettable prepolymers, and a mixture thereof.

14. The composition of claim 13 in which the host matrix is a thermosettable polymer curable by condensation, free radical, ionic or actinic radiation.

15. The composition of claim 11, wherein the host matrix comprises a conducting polymer.

16. The composition of claim 11, wherein the host matrix comprises an energy curable composition.

17. A process comprising dispersing the composition of claim 1 within a host matrix.

18. The process of claim 17, wherein the dispersing is effected by sonication, high shear mixing, media milling or melt mixing.

19. The process of claim 17 wherein dispersing is effected in a propeller equipment.

20. A process comprising dispersing the combination of claim 9 within a host matrix.

21. An article containing or constructed of the composition of claim 1.

22. The article of claim 21, which is an electrical or energy storage device.

23. The article of claim 21, which is a fluid.

24. The article of claim 20 in which the fluid is an ink or a coating.

* * * * *

UNITED STATES PATENT AND TRADEMARK OFFICE
CERTIFICATE OF CORRECTION

| | |
|---|---|
| PATENT NO. | : 8,414,792 B2 |
| APPLICATION NO. | : 13/062830 |
| DATED | : April 9, 2013 |
| INVENTOR(S) | : Jason H. Rouse |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 175 days.

Signed and Sealed this
Sixteenth Day of July, 2013

Teresa Stanek Rea
*Acting Director of the United States Patent and Trademark Office*